United States Patent [19]
Yoshikawa et al.

[11] Patent Number: 5,151,792
[45] Date of Patent: Sep. 29, 1992

[54] VIDEO SIGNAL REPRODUCING APPARATUS WITH MEANS FOR PRODUCING A CROSSTALK ELIMINATED LUMINANCE OUTPUT SIGNAL

[75] Inventors: Takao Yoshikawa, Chiba; Isao Masuda, Tokyo, both of Japan

[73] Assignee: Sony Corporation, Tokyo, Japan

[21] Appl. No.: 659,268

[22] Filed: Feb. 22, 1991

[30] Foreign Application Priority Data

Feb. 27, 1990 [JP] Japan .................................. 2-047012

[51] Int. Cl.⁵ .............................................. H04N 9/71
[52] U.S. Cl. .................... 358/327; 358/328; 358/340
[58] Field of Search ............. 358/328, 329, 340, 36, 358/137, 336, 167, 166, 320, 321, 323, 324, 326; 360/36.1

[56] References Cited

U.S. PATENT DOCUMENTS 4,695,877 9/1987 Matsumoto ........................... 358/36
4,807,049 2/1989 Fukuda ............................... 358/328

Primary Examiner—Roy N. Envall, Jr.
Assistant Examiner—Robert Chevalier
Attorney, Agent, or Firm—Alvin Sinderbrand; William S. Frommer

[57] ABSTRACT

A chrominance signal reproducing circuit reproduces a chrominance signal with reduced crosstalk, as by using a comb filter, and a luminance signal reproducing circuit reproduces a luminance signal. The reproduced luminance signal is delayed by a horizontal line interval and a difference signal is produced representing a difference between the delayed and undelayed luminance signals. A summing circuit sums the difference signal with the delayed luminance signal to produce a crosstalk-eliminated delayed luminance output signal.

14 Claims, 3 Drawing Sheets

VIDEO SIGNAL REPRODUCING APPARATUS WITH MEANS FOR PRODUCING A CROSSTALK ELIMINATED LUMINANCE OUTPUT SIGNAL

BACKGROUND OF THE INVENTION

1. Field of the Invention

This invention relates to apparatus for reproducing video signals from adjacent record tracks on a record medium, more particularly to comb filter apparatus for eliminating crosstalk and, more specifically, to comb filter apparatus which produces a crosstalk-eliminated delayed luminance signal.

2. Description of the Prior Art

In video signal reproducing apparatus, such as a video tape recorder (VTR), a comb filter typically is used to separate luminance and chrominance components and/or to eliminate a crosstalk component from, for example, the chrominance signal which is reproduced from the record medium. As a result, a relative time delay on the order of about one horizontal line interval (1H) is produced between the chrominance and luminance signals that are reproduced.

Since the phase of the chrominance signal is inverted at every line in a field, consistent with the NTSC standard, the phase of the chrominance signal in one track generally is opposite the phase of the chrominance signal in the same relative position in an adjacent track. Although a chrominance signal crosstalk component thus may be picked up from an adjacent track when a given track is scanned, by using a comb filter, this chrominance signal crosstalk component may be eliminated.

The use of a comb filter generally imparts a time delay to the reproduced chrominance signal, such as on the order of about H/2. When color video signals are recorded in the PAL format, the comb filter which is used to eliminate crosstalk exhibits a 2H delay. Consequently, the overall delay imparted to the chrominance signal relative to the luminance signal is on the order of about 1H.

The delay of the chrominance signal relative to the luminance signal as a result of the use of comb filters produces color deterioration in the reproduced video picture. To avoid this deterioration, it has been proposed to delay the reproduced luminance signal by an amount equal to the delay of the chrominance signal so as to equalize the delays imparted to both components. This technique of delaying the reproduced luminance signal is referred to as a delayed luminance reproduction technique, also known as $Y_D$ reproduction.

$Y_D$ reproduction generally calls for the use of a delay circuit to delay the reproduced luminance signal by an interval equal to, for example, 1H. In a typical VTR having the $Y_D$ reproduction capability, a delay circuit dedicated only for delaying the luminance component is provided. However, a special delay circuit which is used for no other purpose adds to the size and expense of the VTR electronics.

OBJECTS AND SUMMARY OF THE INVENTION

Therefore, it is an object of the present invention to provide improved apparatus for reproducing video signal from adjacent tracks using $Y_D$ reproduction without the problems, disadvantages and drawbacks of prior art $Y_D$ reproduction techniques.

Another object of this invention is to provide improved apparatus of the aforementioned type which eliminates crosstalk from the delayed luminance signal $Y_D$.

A further object of this invention is to provide apparatus of the aforementioned type which provides crosstalk elimination for either the reproduced luminance signal Y or the delayed luminance signal $Y_D$.

Various other objects, advantages and features of the present invention will become readily apparent from the ensuing detailed description, and the novel features will be particularly pointed out in the appended claims.

In accordance with this invention, a chrominance reproducer reproduces a chrominance signal with reduced crosstalk from adjacent tracks and a luminance reproducer reproduces a luminance signal also from adjacent tracks. A delay circuit delays the reproduced luminance signal by a horizontal line interval, and a difference circuit produces a difference signal representing the difference between the delayed and undelayed luminance signal. A summing circuit sums the difference signal and the delayed luminance signal to produce a crosstalk-eliminated delayed luminance output signal.

In one embodiment, the difference circuit includes a subtractor for subtracting the delayed luminance signal ($Y_D$) from the reproduced luminance signal (Y) and a gain setting circuit for setting the gain (K) of the output ($Y - Y_D$) of the subtractor to produce the difference signal $[K(Y - Y_D)]$. As a feature of this embodiment, the gain setting circuit comprises an attenuator. Preferably, the attenuator is connected in cascade with a limiter which limits the level of the subtractor output signal prior to attenuation.

As another feature of this invention, a second difference circuit is coupled to subtract the aforementioned difference signal $[K(Y - Y_D)]$ from the undelayed luminance signal (Y) to produce a crosstalk-eliminated undelayed luminance output signal. A selector is provided to select either the crosstalk-eliminated delayed luminance output signal produced by the summing circuit or the crosstalk-eliminated undelayed luminance output signal produced by the second difference circuit for use as the output signal. As an aspect of this feature, the difference signal $[K(Y - Y_D)]$ is coupled to both the summing circuit and the second difference circuit; and a switch couples either the delayed luminance signal or the undelayed luminance signal to both the summing circuit and the second difference circuit.

Preferably, the delay circuit comprises a charge coupled device (CCD).

As a preferred aspect, the chrominance reproducer includes a comb filter for eliminating crosstalk from the reproduced chrominance signal.

BRIEF DESCRIPTION OF THE DRAWINGS

The following detailed description, given by way of example, will best be understood in conjunction with the accompanying drawings in which.

DETAILED DESCRIPTION OF PREFERRED EMBODIMENTS

Figure 1:
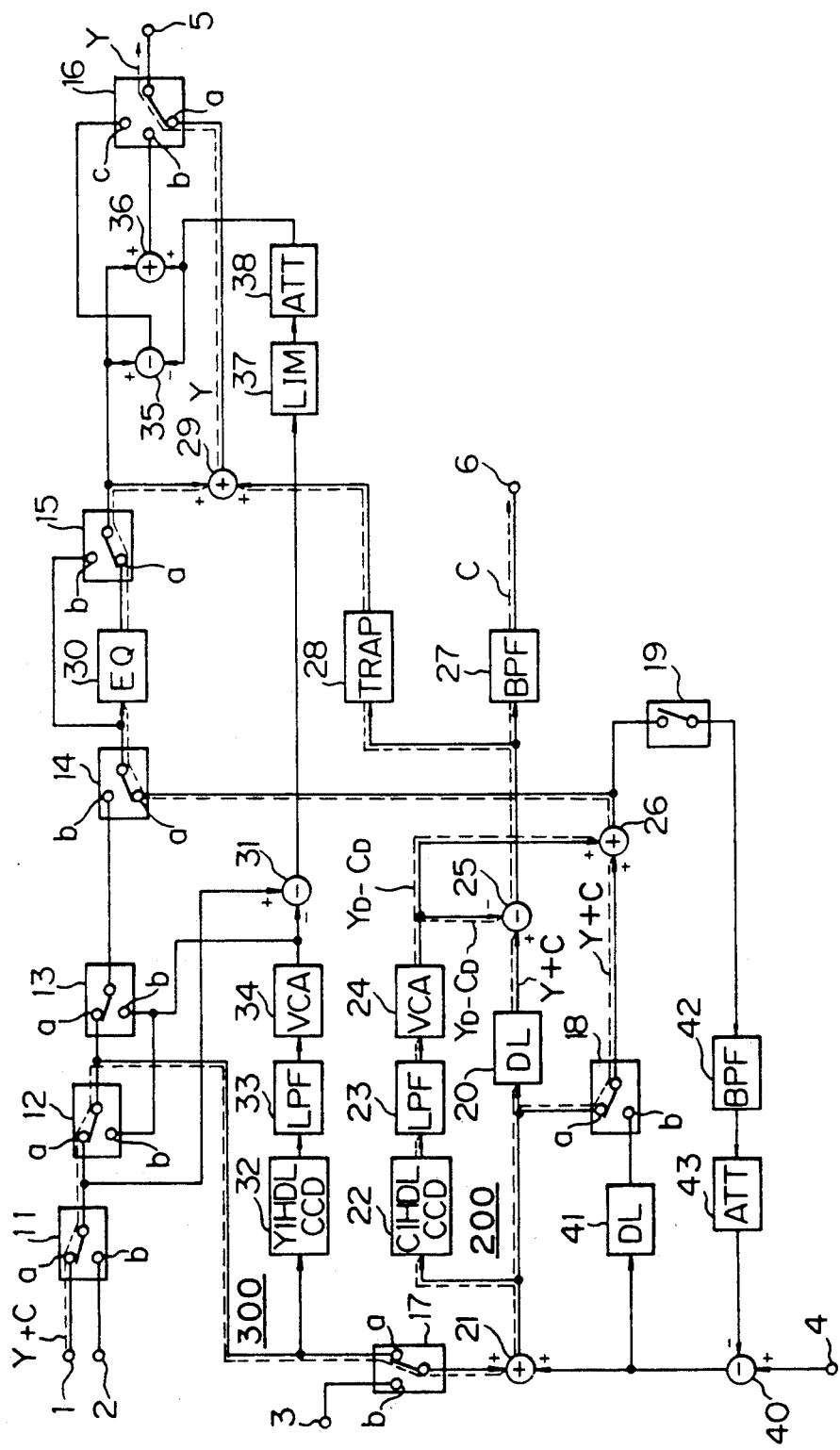
FIG. 1 is a block diagram illustrating how the reproducing apparatus which incorporates the present invention can be used to record a color video signal.
Figure 2:
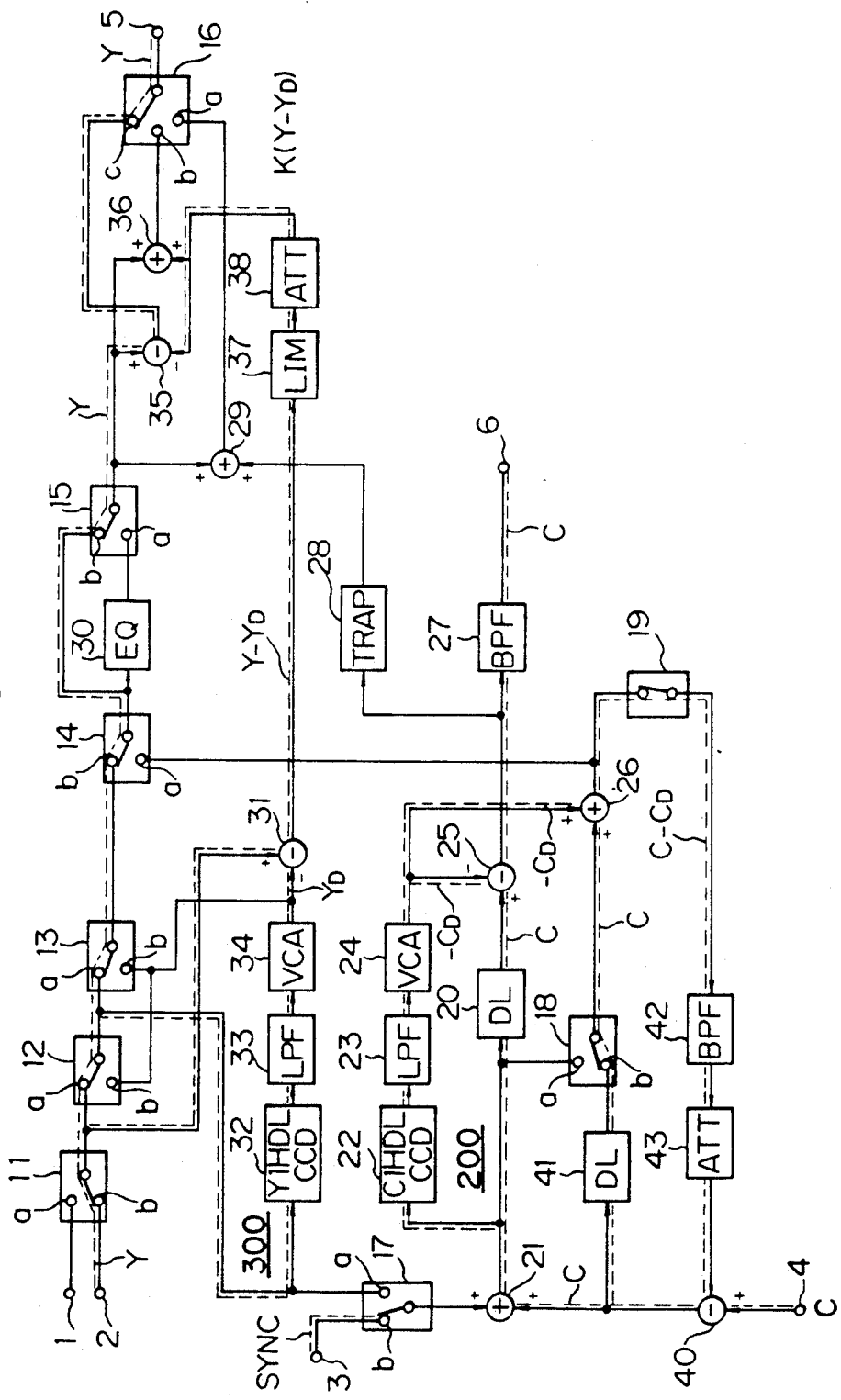
FIG. 2 is a block diagram illustrating how the reproducing apparatus which incorporates the present invention operates in a normal reproducing mode to produce a crosstalk-eliminated luminance output signal.
Figure 3:
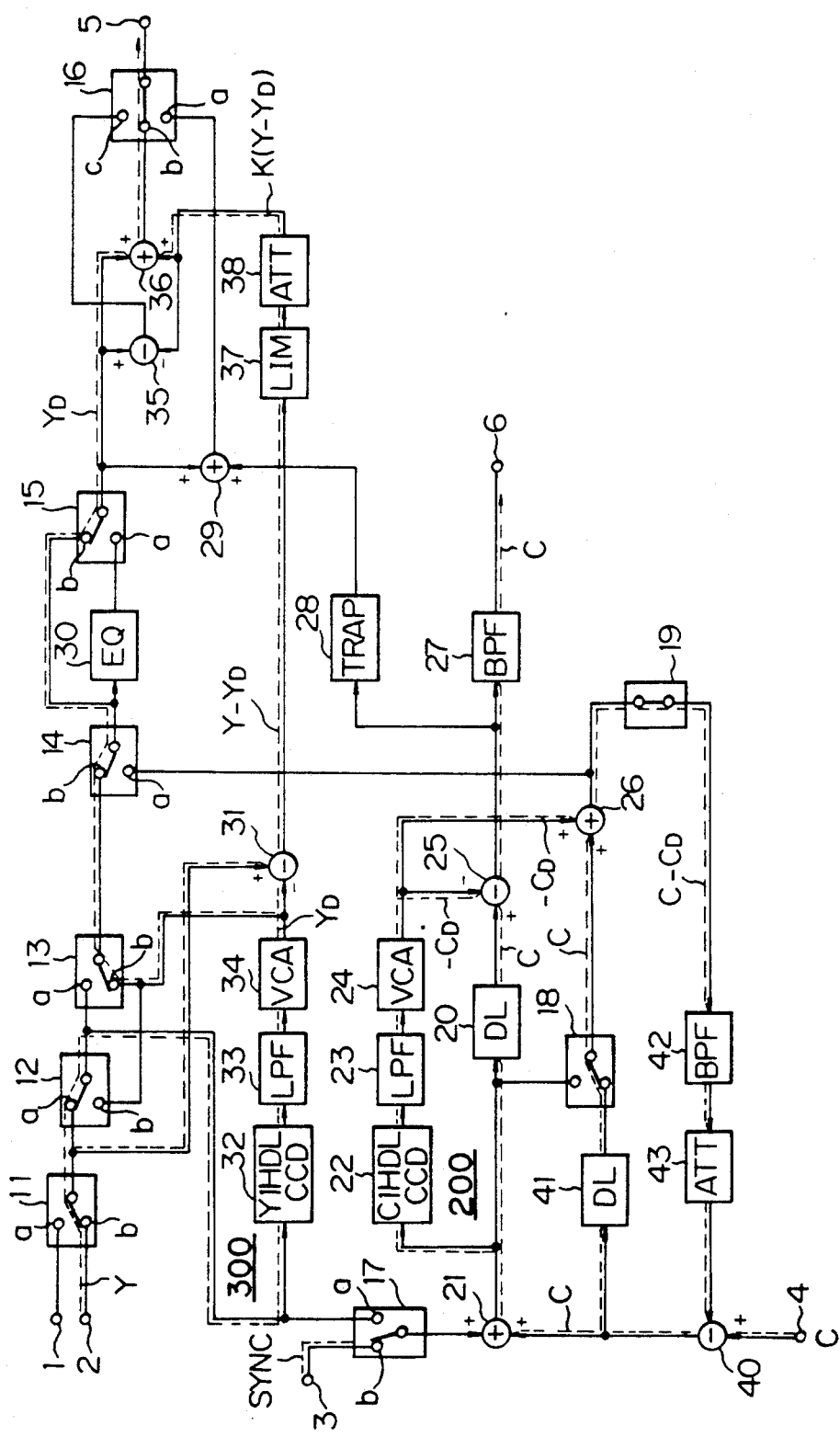
FIG. 3 is a block diagram illustrating how the reproducing apparatus which incorporates the present invention is used in a $Y_D$ mode to produce a crosstalk-eliminated delayed luminance output signal.

FIGS. 1-3 represent circuitry which incorporates the present invention and which can be used selectively to record or to reproduce a color video signal. The circuitry includes a chrominance comb filter 200 which, during recording, is operative to separate luminance and chrominance components from a composite video signal (Y+C), a luminance comb filter 300 which is operative during reproduction to derive a crosstalk component from the reproduced luminance signal, a trap circuit 28 which is operative during recording to extract a luminance component that may be present in the chrominance component that is separated from the composite video signal and an attenuator circuit 38 which is operative during reproduction to attenuate the crosstalk component that is detected in the reproduced luminance signal.

Referring first to FIG. 1, the following describes the manner in which these circuits are connected and cooperate to separate and record luminance and chrominance components Y and C from a received composite video signal (Y+C).

An input composite video signal (Y+C) is supplied to an input terminal 1 and is coupled by way of cascaded switches 11 and 12 to the inputs of chrominance comb filter 200 and luminance comb filter 300, respectively. Switches 11 and 12, as well as the remaining switches described herein, are illustrated as electromechanical switches adapted to exhibit conditions a and b. In a preferred embodiment, these switches comprise solid-state electronic switches capable of being disposed in condition a or condition b for the purposes described herein. During recording, each of switches 11 and 12 is disposed in its condition a to couple the composite video signal to the input of chrominance comb filter 200 by way of yet another switch 17 and a summing circuit 21; and luminance comb filter 300 is not used.

As will be described below, signals are supplied to summing circuit 21 by way of a bipolar switch 19 and by way of an input terminal 4. During recording, switch 19 is opened and no signal is applied to terminal 4. Hence, summing circuit 21 does not add any other component to the composite video signal (Y+C) supplied to the chrominance comb filter.

In the preferred embodiment, the chrominance comb filter is adapted to impart to the signal supplied thereto a delay having a duration equal to one horizontal line interval. As is known by those of ordinary skill in the art, the chrominance comb filter includes a delay circuit 22, known as a 1H delay for delaying the composite video signal by one line interval. Preferably, this 1H delay circuit is comprised of charge coupled devices (CCDs), although other conventional delay circuits may be used. Chrominance comb filter 200 includes a low pass filter 23 coupled to the output of 1H delay circuit 22 and a voltage controlled amplifier 24 for adjusting the gain of the signal passed by low pass filter 23. The output of amplifier 24 is a 1H delayed version of the composite color video signal (Y+C) then being supplied to input terminal 1.

Consistent with the NTSC standard, since the phase of the chrominance signal is inverted at each line interval, it is appreciated that the phase of the 1H delayed chrominance signal $C_D$ at the output of amplifier 24 is opposite the phase of the undelayed chrominance signal C then being received. A subtractor 25 has one input coupled to the output of amplifier 24 and another input coupled to receive the composite color video signal (Y+C) then being supplied to input terminal 1 (referred to as the undelayed composite color video signal) so as to subtract the delayed version of the composite video signal from the undelayed composite video signal. A delay circuit 20 imparts a relatively small delay to the received composite video signal (Y+C) to compensate for inherent delays in summing circuit 21, low pass filter 23 and amplifier 24. Thus, delays (or phase shifts) which otherwise might be imparted by these circuits are canceled.

The output of subtractor 25 is coupled to a chrominance output terminal 6 by way of a band pas filter 27 whose pass band is centered on the chrominance subcarrier and is adapted to substantially eliminate any residual luminance component that may be present at the output of subtractor 25. In addition, this subtractor is coupled to a trap circuit 28 adapted to trap a luminance component that may be present in the subtractor output.

A summing circuit 26 is coupled to the output of amplifier 24 and also, by way of a switching circuit 18, to the output of summing circuit 21. Switching circuit 18 is similar to aforedescribed switching circuits 11 and 12; and admits of its condition a in the recording mode. Summing circuit 26 is adapted to sum the delayed composite video signal ($Y_D - C_D$) with the undelayed composite video signal (Y+C) which then is being supplied to input terminal 1. The output of summing circuit 26 is coupled to an equalizer 30 by way of a switching circuit 14. This switching circuit is similar to aforedescribed switching circuits 11 and 12 and admits of its condition a when in the recording mode. Equalizer 30 is adapted to equalize the delay inherent in trap circuit 28, to be described.

Luminance comb filter 300 includes a 1H delay circuit 32 which, like 1H delay circuit 22, is comprised of CCDs. The output of this 1H delay circuit is coupled to a subtracting circuit 31 by way of a low pass filter 33 and a variable gain amplifier 34. Luminance comb filter 300 is utilized during reproduction and is described further hereinbelow.

The output of comb filter 300 is coupled to an attenuator 38 by way of a limiter 37, the attenuator functioning to attenuate by a coefficient K the difference signal produced by subtracting circuit 31. The attenuated signal is supplied to yet another subtracting circuit 35 and to a summing circuit 36 which are used during reproduction. An output switch 16 admits of three conditions a, b and c. Condition a is assumed during a recording mode and either position b or position c is assumed during reproduction, as will be described. As shown, summing circuit 36 includes an output that is coupled to an output terminal 5 when switch 16 assumes condition b; and subtracting circuit 35 includes an output coupled to output terminal 5 when this switch assumes condition c. In the recording mode described herein, switch 16 assumes its condition a and couples the output of a summing circuit 29 to output terminal 5. This summing circuit is coupled to trap circuit 28 and, by way of a switch 15, to equalizer 30. It will be appreciated that switch 15 is similar to aforedescribed switch 11 and assumes its condition a during a recording mode.

To carry out a recording mode operation, switches 11, 12, 13, 14, 15, 16, 17 and 18 all assume their respective condition a; and switch 19 is opened. A composite video signal (Y+C) is supplied to input terminal 1 and is coupled by way of switches 11 and 12 to chrominance comb filter 200. The composite video signal also is coupled by switch 11 to subtracting circuit 31; but since the output of this subtracting circuit is not utilized during a recording operation, further description thereof is not provided. For convenience, the signal paths which are used during the recording operation are illustrated by broken lines in FIG. 1.

1H delay circuit 22 delays the composite video signal (Y+C) by one line interval. Consequently, the delayed chrominance component of the composite video signal may be thought of as exhibiting inverse polarity relative to the undelayed chrominance component. The delayed composite video signal produced by 1H delay circuit 22, low pass filter 23 and amplifier 24 thus may be represented as $(Y_D - C_D)$ where the subscript D identifies the delayed signal. The delayed composite video signal $(Y_D - C_D)$ is supplied to subtracting circuit 25 whereat it is subtracted from the undelayed composite video signal (Y+C) supplied to the subtracting circuit by switches 11, 12 and 17. Phase differences between the delayed and undelayed composite video signal due to inherent delays in various circuit elements are compensated by delay circuit 20 which couples the composite video signal (Y+C) applied to input terminal 1 to subtracting circuit 25.

The subtracting circuit functions to subtract the delayed composite video signal from the undelayed composite video signal, resulting in the output $(Y+C)-(Y_D-C_D)=2C$. Consistent with the theory of operation of a comb filter, it is assumed that the luminance and chrominance information in successive line intervals is substantially constant. Accordingly, subtracting circuit 25 serves to extract the chrominance component from the composite video signal applied to input terminal 1. This extracted chrominance component is applied to trap circuit 28 and it also is coupled to output terminal 6 by band pass filter 27, from which it may be recorded on a suitable record medium.

The delayed composite video signal $(Y_D-C_D)$ produced by the combination of 1H delay circuit 22, low pass filter 23 and amplifier 24 also is supplied to summing circuit 26. The undelayed composite video signal (Y+C) applied to input terminal 1 also is coupled to summing circuit 26 by way of switch 18. This switch exhibits an inherent time delay approximately equal to that of delay circuit 20.

Summing circuit 26 adds the delayed composite video $(Y_D-C_D)$ to the undelayed composite video signal (Y+C), thereby extracting the luminance component Y therefrom. This extracted luminance component Y is coupled to summing circuit 29 by way of equalizer 30, whereat it is summed with a residual luminance component that may be present in the chrominance component extracted by subtracting circuit 25 and trapped in trap circuit 28. The trap circuit is conventional and is adapted to eliminate frequencies equal to or in the vicinity of the chrominance subcarrier frequency $f_{SC}$. Thus, the trap circuit effectively traps a luminance component that, nevertheless, may accompany the extracted chrominance component produced by subtracting circuit 25.

Summing circuit 29 sums the luminance component extracted by summing circuit 26 from the composite video signal (Y+C) with the trapped luminance component that may accompany the extracted chrominance component. Thus, summing circuit 29 combines the luminance component separated by comb filter 200 with any residual luminance component that may not have been eliminated by the comb filter. The resultant luminance signal produced by this summing circuit is coupled to output terminal 5 by switch 16 which, in the recording mode, assumes its condition a. Hence, luminance and chrominance components are supplied to output terminals 5 and 6 from which they may be recorded.

Let it now be assumed that the circuitry illustrated in FIG. 1 is operated for reproduction. Let it further be assumed that the reproduction mode is a so-called "normal" reproduction mode wherein separate luminance and chrominance components are reproduced from the record medium and crosstalk that may be present in the reproduced luminance component is eliminated therefrom. As will be described, this "normal" reproduction mode is distinguished from the delayed luminance reproduction mode wherein crosstalk is eliminated from the delayed version of the luminance component $Y_D$ that is reproduced from the record medium.

In the "normal" reproduction mode, the various switches assume their condition b, except that switches 12 and 13 maintain their condition a and switch 16 assumes condition c. In addition, switch 19 is closed. This is shown in FIG. 2 wherein broken lines illustrate the signal paths which are followed during a "normal" reproduction mode.

It is assumed that, during reproduction, the luminance and chrominance components Y and C reproduced from the record medium are supplied to separate input terminals 2 and 4, respectively. The luminance component is supplied to 1H delay circuit 32 of the luminance comb filter 300 via switches 11 and 12; and the luminance component also is supplied to subtracting circuit 31 by way of switch 11. 1H delay circuit 32 delays the reproduced luminance component by a duration equal to one horizontal line interval, and low pass filter 33 and amplifier 34 supply this delayed luminance component $Y_D$ to subtracting circuit 31 whereat it is subtracted from the undelayed luminance component Y. Subtracting circuit 31 thus produces a difference signal $(Y-Y_D)$ which is a function of crosstalk present in the luminance component Y now being reproduced. The gain K of this difference signal is adjusted, as by attenuation by the cascade combination of limiter 37 and attenuator 38, resulting in a crosstalk component $K(Y-Y_D)$. Limiter 37 limits the level of the difference signal $(Y-Y_D)$ prior to attenuation.

The reproduced luminance signal Y is coupled in common to subtracting circuit 35 and to summing circuit 36 via switches 11, 12, 13, 14 and 15. Equalizer 30 is bypassed in the reproduction mode because there is no need to compensate for delays inherent in trap circuit 28. It will be appreciated that, during reproduction, the trap circuit is not used.

As mentioned above, in the "normal" reproduction mode, switch 16 assumes its condition c. Accordingly, the output of subtracting circuit 35, which subtracts the crosstalk component $K(Y-Y_D)$ from the undelayed luminance component Y is coupled to output terminal 5. Thus, any crosstalk which may be present in the reproduced luminance component Y is eliminated therefrom by subtracting circuit 35. The resultant crosstalk-eliminated luminance signal Y is supplied as a luminance output signal at output terminal 5.

The reproduced chrominance component C supplied to input terminal 4 is coupled via a subtracting circuit 40 (to be described) to a summing circuit 21 whereat the reproduced chrominance component is combined with a pseudosynchronizing signal SYNC supplied to terminal 3 from a suitable source. The pseudosynchronizing signal SYNC is coupled by switch 17, which assumes its condition b, to summing circuit 21. This pseudosynchronizing signal exhibits a repetitive rate equal to the horizontal synchronizing frequency, but is of a pulse width that is narrower than the conventional horizontal synchronizing signal. The combined chrominance and pseudosynchronizing signal SYNC is coupled to chrominance comb filter 200. For convenience, the combined chrominance component and pseudosynchronizing signal is referred to herein merely as the chrominance component. It will be appreciated from the ensuing discussion that the presence of the pseudosynchronizing signal does not affect the chrominance processing circuitry which functions to eliminate a crosstalk component that may be present in the reproduced chrominance component C.

1H delay circuit 22 delays the chrominance component C by one horizontal line interval; and the delayed chrominance component is supplied to subtracting circuit 25 and also to summing circuit 26 by low pass filter 23 and amplifier 24. The delay imparted to the chrominance component effectively reverses the polarity thereof relative to the undelayed chrominance component then being supplied to input terminal 4. Hence, FIG. 2 illustrates a delayed, inverted chrominance component $-C_D$ supplied to subtracting circuit 25 whereat it is subtracted from the undelayed chrominance component C supplied to input terminal 4 and coupled to the subtracting circuit by delay circuit 20. As was discussed above in conjunction with FIG. 1, delay circuit 20 functions to compensate for phase and time delays inherent in the operating circuitry which processes the chrominance component.

Subtracting circuit 25 performs the following operation:

$$C - (-C_D) = C + C_D = 2C$$

However, it is assumed that a crosstalk component which may be present in the reproduced chrominance component C is of the same phase as the crosstalk component which accompanies the delayed chrominance component $C_D$. Consequently, these in-phase crosstalk components cancel in subtracting circuit 25. As a result, band pass filter 27 supplies a crosstalk-eliminated chrominance component C to output terminal 6.

Summing circuit 26 functions to extract the crosstalk component (as distinct from canceling it) that may be present in the reproduced chrominance component C. As mentioned above, the delayed chrominance component $-C_D$ is supplied to the summing circuit whereat it is summed with the reproduced chrominance component C supplied thereto by switch 18 (disposed in its condition b) and delay circuit 41. The delay circuit is similar to delay circuit 20 and functions to compensate for inherent delays that may otherwise impart a relative phase shift between the delayed chrominance component $C_D$ and the undelayed chrominance component C. Accordingly, the signal $(C - C_D)$ produced by summing circuit 26 is representative of the crosstalk component that may be present in the chrominance component C.

Switch 19 is closed to couple the extracted crosstalk component $(C - C_D)$ to the combination of band pass filter 42, which is tuned to the chrominance subcarrier frequency $f_{SC}$, and attenuator 43. The output of attenuator 43 is supplied to subtracting circuit 40, whereat the attenuated crosstalk component $(C - C_D)$ is subtracted from the reproduced chrominance component C. Hence, subtracting circuit 40 operates to substantially eliminate the crosstalk that may accompany the reproduced chrominance component supplied to input terminal 4. It is appreciated that subtracting circuit 25 provides further elimination of any crosstalk which may not be sufficiently removed by subtracting circuit 40.

Thus, the combination of luminance comb filter 300 and subtracting circuit 35 produces a crosstalk-eliminated luminance output signal at output terminal 5; and the combination of chrominance comb filter 200 and subtracting circuit 40 produces a chrominance signal at output terminal 6 with reduced crosstalk.

A delayed luminance ($Y_D$) reproduction mode now will be described in conjunction with FIG. 3. The switch arrangements shown in FIG. 3 differ from those which Were discussed in conjunction with FIG. 2 in that switch 13 now assumes its condition b and switch 16 likewise assumes its condition b. In this configuration, switch 16 couples the output of summing circuit 36 to output terminal 5 and subtracting circuit 35 is effectively not used. In addition, the delayed luminance component $Y_D$ derived from 1H delay circuit 32, low pass filter 33 and amplifier 34 is coupled to summing circuit 36 via switches 13, 14 and 15. However, from FIG. 2, it is seen that the undelayed luminance component Y is coupled by switch 13 to subtracting circuit 35. Hence, when carrying out the delayed luminance reproduction mode, the delayed luminance component rather than the undelayed luminance component has crosstalk eliminated therefrom. The manner in which this is carried out now is described.

As was the case in the "normal" reproduction mode, the delayed luminance component $Y_D$ produced by 1H delay circuit 32, low pass filter 33 and amplifier 34 is subtracted in subtracting circuit 31 from the undelayed, reproduced luminance component Y, thus producing the difference signal $(Y - Y_D)$ which represents the crosstalk component. Limiter 37 and attenuator 38 serve to multiply this difference signal by the coefficient K to produce the crosstalk component $K(Y - Y_D)$.

As mentioned above, and as is shown in FIG. 3, the delayed luminance component $Y_D$ provided by amplifier 34 is coupled to summing circuit 36 by Way of switches 13, 14 and 15. By summing the crosstalk component $K(Y - Y_D)$ with the delayed luminance component $Y_D$, crosstalk which accompanies the delayed luminance component is eliminated. This is best appreciated by comparing the operation of summing circuit 36 during the delayed luminance reproduction mode with the operation of subtracting circuit 35 during the "normal" reproduction mode.

During normal reproduction, subtracting circuit 35 produces an output signal represented as:

$$Y - K(Y - Y_D)$$

A transfer function between the undelayed and delayed luminance components may be expressed as:

$$Y_D = YZ^{-1}$$

Accordingly, the operation carried out by subtracting circuit 35 during "normal" reproduction may be expressed as:

$$H(Z) = 1 - K(1 - Z^{-1}) \quad (1)$$

Now, during the delayed luminance reproduction mode, summing circuit 36 adds the delayed luminance component $Y_D$ with the crosstalk component $K(Y - Y_D)$ to produce the following:

$$Y_D + K(Y - Y_D) = Y_D - K(Y_D - Y)$$

As before, the transfer function between the delayed and undelayed luminance components may be expressed as:

$$Y_D = YZ^{-1}$$

From the previous equation which represents the operation of summing circuit 36, the following is obtained:

$$H(Z) = Z^{-1}[1 - K(1 - Z^{-1})] \quad (2)$$

From equation (2) it is seen that, by adding the delayed luminance component $Y_D$ and the crosstalk component $K(Y - Y_D)$, the crosstalk component which accompanied the delayed luminance component $Y_D$ is canceled. Thus, switch 16 couples to output terminal 5 a crosstalk-eliminated delayed luminance output signal.

In the comb filters described herein, the temperature characteristics of the CCD 1H delay circuits may affect the respective delays produced thereby. However, conventional techniques are known whereby the temperature characteristics of CCDs are compensated to obviate such changes in delay. For example, one or more CCD elements may be bypassed by switching circuits that are controlled as a function of increased delay due to increased temperature. Alternatively, additional CCD elements may be switched into the signal path as a function of sensed temperature changes. Still further, delay elements which exhibit very small time delays, comparable to the time delay imparted by a single CCD device, may be switched into the circuit paths which supply undelayed luminance components to subtracting circuit 31 and which supply undelayed chrominance components to subtracting circuit 25 and to summing circuit 26, thereby to compensate for an increase in delay produced by CCD delay circuits 32 and 22, respectively, as a result of temperature changes. Thus, by adding a small delay to the otherwise undelayed component, undue influences caused by the temperature characteristics of the CCD delay circuits 22 and 32 are canceled. This latter approach is preferred because it does not deteriorate the signal-to-noise (S/N) ratio.

A comparison of the circuit elements shown in FIGS. 1, 2 and 3 indicates that no additional delay elements or storage devices are needed to implement the delayed luminance reproduction mode. Indeed, the same circuit elements which are used in the FIG. 2 implementation of the "normal" reproduction mode are used in the FIG. 3 implementation of the delayed luminance reproduction mode (except, of course, that subtracting circuit 35 is used during the "normal" reproduction mode and summing circuit 36 is used during the delayed luminance reproduction mode). Hence, the additional expense and complexity that otherwise would be occasioned by providing additional delay circuits, as has been required heretofore in implementing the delayed luminance reproduction mode, are avoided.

While the present invention has been particularly shown and described with reference to preferred embodiments, it is readily appreciated by those of ordinary skill in the art that various changes and modifications may be made without departing from the spirit and scope of the invention. It is intended that the appended claims be interpreted as covering the embodiments specifically disclosed, the aforementioned changes and modifications, and all other equivalents thereto.

What is claimed is:

1. In apparatus for reproducing video signals from adjacent tracks on a record medium, the combination comprising: chrominance signal reproducing means for reproducing a chrominance signal with reduced crosstalk; luminance signal reproducing means for reproducing a luminance signal; delay means for delaying the reproduced luminance signal by a horizontal line interval; difference means for producing a difference signal representing a difference between the delayed and undelayed luminance signals; first combining means for combining the difference signal and the delayed luminance signal to produce a crosstalk-eliminated delayed luminance signal; second combining means for combining the difference signal and the reproduced luminance signal to produce a crosstalk-eliminated undelayed luminance signal; and selector means for selecting the crosstalk-eliminated delayed luminance signal or the crosstalk-eliminated undelayed luminance signal as a luminance output signal.

2. The combination of claim 1 wherein said difference means comprises subtracting means for subtracting the delayed luminance signal ($Y_D$) from the reproduced luminance signal (Y) to produce an output signal ($Y - Y_D$), and gain setting means for setting the gain (K) of said output signal to produce said difference signal.

3. The combination of claim 2 wherein said gain setting means comprises attenuating means for attenuating said output signal.

4. The combination of claim 3 wherein said gain setting means further comprises limiting means connected in cascade with said attenuating means for limiting the level of said output signal prior to attenuation thereof.

5. The combination of claim 1 wherein said first combining means comprises summing means and said second combining means comprises second difference means coupled to receive said difference signal, and means for supplying the undelayed luminance signal to said second difference means to produce said crosstalk-eliminated undelayed luminance output signal as a function of the difference between said undelayed luminance signal and said difference signal; and said selector means selects the crosstalk-eliminated delayed luminance output signal produced by said summing means or the crosstalk-eliminated undelayed luminance signal produced by said second difference means.

6. The combination of claim 5 wherein said difference signal is coupled to both said summing means and said second difference means; and further comprising switch means operable in a first condition for supplying the delayed luminance signal to said summing means and operable in a second condition for supplying the undelayed luminance signal to said second difference means.

7. The combination of claim 6 wherein said switch means couples either the delayed luminance signal or the undelayed luminance signal to both said summing means and said second difference means.

8. The combination of claim 1 wherein said delay means comprises a charge coupled device (CCD).

9. The combination of claim 1 wherein said chrominance signal reproducing means includes a comb filter for eliminating crosstalk from the reproduced chrominance signal.

10. The combination of claim 9 wherein said comb filter comprises chrominance delay means for delaying the reproduced chrominance signal by a horizontal line interval, combining means for combining the delayed and undelayed chrominance signal to produce a chrominance difference signal, and chrominance subtracting means for subtracting the chrominance difference signal from the reproduced chrominance signal.

11. The combination of claim 10 wherein said chrominance subtracting means is coupled to supply an output thereof to said chrominance delay means, and wherein said combining means comprises chrominance summing means for summing the output of said chrominance delay means with the output of said chrominance subtracting means and for supplying the summed outputs to said chrominance subtracting means for subtraction from the reproduced chrominance signal.

12. The combination of claim 11 wherein said comb filter further includes second chrominance subtracting means for obtaining the difference between the output of the first-mentioned chrominance subtracting means and the output of said chrominance delay means for producing crosstalk-eliminated chrominance output signal.

13. The combination of claim 9 further comprising a source of synchronizing signal; and adding means for adding the synchronizing signal to the reproduced chrominance signal.

14. The combination of claim 13 wherein said synchronizing signal exhibits a frequency equal to a video signal horizontal sync frequency.

* * * * *